(12) United States Patent
Pugh (10) Patent No.: US 6,428,323 B1
(45) Date of Patent: Aug. 6, 2002

(54) MEDICAL EXAMINATION TEACHING SYSTEM

(76) Inventor: Carla M. Pugh, 759 Portwalk Pl., Redwood City, CA (US) 94065

( * ) Notice: Subject to any disclaimer, the term of this patent is extended or adjusted under 35 U.S.C. 154(b) by 0 days.

(21) Appl. No.: 09/650,970

(22) Filed: Aug. 29, 2000

Related U.S. Application Data

(60) Provisional application No. 60/151,478, filed on Aug. 30, 1999.

(51) Int. Cl.$^7$ ............................................... G09B 23/30
(52) U.S. Cl. ........................................ 434/274; 434/262
(58) Field of Search ................................ 434/350, 322, 434/323, 118, 119, 273, 272, 262

(56) References Cited

U.S. PATENT DOCUMENTS

| | | | | |
|---|---|---|---|---|
| 2,495,568 A | * | 1/1950 | Coel | 434/273 |
| 3,921,311 A | * | 11/1975 | Beasley et al. | 434/273 |
| 4,360,345 A | | 11/1982 | Hon | 434/262 |
| 4,907,973 A | | 3/1990 | Hon | 434/262 |
| 5,472,345 A | | 12/1995 | Eggert | 434/273 |
| 5,800,177 A | | 9/1998 | Gillio | 434/262 |
| 5,800,178 A | | 9/1998 | Gillio | 434/262 |
| 5,800,179 A | | 9/1998 | Bailey | 434/262 |
| 5,853,292 A | | 12/1998 | Eggert et al. | 434/262 |
| 5,882,206 A | | 3/1999 | Gillio | 434/262 |
| 5,951,301 A | * | 9/1999 | Younker | 434/272 |
| 5,957,694 A | | 9/1999 | Bunch | 434/262 |
| 6,234,804 B1 | * | 5/2001 | Yong | 434/267 |

* cited by examiner

Primary Examiner—Valencia Martin-Wallace
Assistant Examiner—Kathleen M. Christman
(74) Attorney, Agent, or Firm—Lumen Intellectual Property Services

(57) ABSTRACT

A system for teaching students to perform medical exams performed manually inside a body cavity includes an anatomical simulator with a simulator cavity, a tactile sensor in the simulator, and a feedback presentation unit in communication with the sensor. The tactile sensor generates a signal in response to a manual contact with an inside surface of the simulator cavity, and performance of the exam inside the simulator cavity generates a series of signals. The simulator can include removable anatomical parts, the surfaces of which make up the inside surface of the simulator cavity. The sensor is preferably a force sensing resistor and the signal is representative of the applied force. The feedback presentation unit is preferably a computer system, and the feedback may consist of a graphical display of information gathered by the sensor, or a rating of the exam performance. Pressure, time, and other data gathered from student performance of the exam are compared with a reference exam to derive a student rating, which may include instruction to the student during the exam. Realistic patient environments are simulated with video and audio signals.

31 Claims, 7 Drawing Sheets

MEDICAL EXAMINATION TEACHING SYSTEM

CROSS-REFERENCE TO RELATED APPLICATIONS

This application claims the benefit of U.S. Provisional Application No. 60/151,478 filed Aug. 30, 1999, which is herein incorporated by reference.

FIELD OF THE INVENTION

This invention relates generally to a system for teaching students and health care professionals to perform medical examinations. More particularly, it relates to a system for teaching medical examinations performed manually inside a body cavity or anatomical space.

BACKGROUND ART

One of the most difficult examinations that students learn to perform in the first years of medical school is the female pelvic examination. The exam is generally taught through textbook reading, lectures, and observation of experienced physicians performing the exam. While these techniques contribute to the student's overall knowledge, they do not provide the hands-on learning essential for development of proper technique.

Both live patients and manikins can provide the necessary hands-on learning. Live patients willing to be practiced on by inexperienced students, however, are in short supply. When available, this self-selected group does not necessarily provide a good baseline for teaching exams on healthy patients. Low-income women without access to regular medical care are often motivated to volunteer by financial incentive or incipient health problems. Other volunteers, including paid models, feel a duty to teach the students proper technique and can be quite assertive, further diminishing the student's already fragile confidence in his or her examination procedure. The use of paid models can also be very expensive, and not all medical schools can afford this luxury. Another problem is the limited amount of time that the paid models are available.

To eliminate these potentially stressful problems and limitations, manufacturers have developed anatomical simulators or manikins to provide uniform environments in which the student can practice the exam as frequently as desired. One such gynecological simulator, known as ZOE™, is disclosed in U.S. Pat. No. 5,472,345 to Eggert. While ZOE™ is an excellent model of a human female pelvis, it presents a few problems for the instructor. The hands of the person performing the exam on the simulator are not visible to an observer; a student watching an instructor does not obtain a clear picture of basic internal exam technique, nor is an instructor able to accurately judge a student's performance. Even with a cut-away or transparent region or suitable internal lighting, the simulator cannot significantly overcome the problem of limited visibility. Without detailed feedback, the student may not learn the essential elements of the exam or may develop improper technique. Unfortunately, the prevailing attitude in medical schools is that this type of manual exam is eventually learned through experience, and educators tend to tolerate the above problems.

In the last few decades, educators in many fields have used new technology to better implement proven educational methods. Medicine has, in general, been slow to implement new educational practices or technologies.

One area which has incorporated computerized techniques to improve the training process is life support. Systems have been developed for teaching medical procedures to students using manikins or other simulators containing sensors interfaced with computers containing teaching modules. U.S. Pat. Nos. 4,360,345 to Hon and 5,853,292 to Eggert et al. disclose two such systems for teaching cardiopulmonary resuscitation (CPR) and other basic physiological procedures. One important goal of these systems is to eliminate the need for instructors, thereby increasing the availability and decreasing the cost of training. In addition, these systems aim to provide realistic models for human patients and for expensive equipment. In general, they provide feedback similar to what can be provided by an instructor, experienced practitioner, or standard manikins and instruments. For all of the techniques taught, such as manual chest compressions, an instructor has access to the student's hands, and can therefore provide the same feedback as the sensors. Specifically, the systems do not provide information on exams performed manually inside body cavities, for which there is currently no means for assessing exam performance.

Systems are also available for simulating minimally invasive surgical procedures. In this field, as opposed to classical surgery with its large incisions, full anesthesia, and long hospitalizations, an instrument is inserted into a small incision made in the patient. A surgeon conducts a procedure using tactile feedback imparted through the instrument combined with real-time visual display images of the patient's internal landscape. Teaching systems for these surgical techniques focus on a virtual instrument interfaced with a computer system containing real image data. Some examples are disclosed in U.S. Pat. Nos. 4,907,973, issued to Hon, 5,800,179, issued to Bailey, and 5,800,177, 5,800,178, and 5,822,206, all issued to Gillio. The virtual instrument is inserted into an orifice, and movement of the instrument produces an image and other feedback on a display monitor. By varying the image data, many different types of operations can be practiced. These systems are highly specialized to minimally invasive surgery. Anatomical accuracy is provided by the image data, not by the orifice or access sites, and they are not applicable for teaching manually performed exams or palpation techniques.

There is a need, therefore, for a system for training students to perform pelvic and other internal exams, of which a key measure of success is the tactile contact provided by the student.

OBJECTS AND ADVANTAGES

Accordingly, it is a primary object of the present invention to provide a training system that provides immediate feedback to students performing a medical exam manually inside a body cavity, for example, a pelvic or rectal exam. The system provides feedback that an instructor alone cannot give.

It is a further object of the invention to provide a teaching system that measures a student's performance against an objective standard and provides a rating of the student's performance.

It is an additional object of the invention to provide a system that simulates various environments in which an exam occurs, including an examination room or emergency room, and various types of patients, including a wide range of clinical conditions and demographics.

It is another object of the present invention to provide a system that interfaces with different feedback presentation units, some of which make the unit portable.

It is a further object of the present invention to provide a system that can be used for any type of medical examination performed manually within an anatomical space that is hidden from view.

Finally, it is an object of the present invention to provide a system that is economical to construct and easy to transport.

SUMMARY

These objects and advantages are attained by a system for training a student to perform a medical exam performed manually inside a body cavity, part of whose inside surface is not visible to the student. An instructor cannot see what the student's hands are doing inside the body cavity, and so the system provides feedback that allows both the student and instructor to immediately judge the student's proficiency in performing the exam. The system has three main parts: an anatomical simulator with a simulator cavity, a tactile sensor in the anatomical simulator, and a feedback presentation unit in communication with the sensor. When manual contact is made with an inside surface of the simulator cavity, the sensor generates a signal in response. Performance of the exam inside the simulator cavity generates a set of signals from the sensor, which are used by the feedback presentation unit to provide feedback for the exam.

Any exams requiring palpation or manual assessment inside body cavities can be taught, such as pelvic exams, rectal exams, or surgical procedures including abdominal, pelvic, and thoracic (chest) surgery. The simulator and feedback are correlated with the exam; for example, the simulator is a manikin of the lower torso of a human female for teaching pelvic exams. The simulator and feedback are also adjustable to select one of a number of predetermined exams. Preferably, the simulator includes removable anatomical parts, for example, a cervix, uterus, and ovaries, and the surfaces of these parts make up a portion of the inside surface of the cavity. Some of the removable anatomical parts may represent a diseased condition; the exam is then correlated with the diseased or normal condition. The student learns which exam to perform by manually detecting which removable part is in the simulator. The sensor is preferably a force sensing resistor, and the signals generated by the sensor are representative of a force on the inside surface of the simulator cavity.

The type of feedback provided varies with the feedback presentation unit. The feedback may be an indication of completion of the exam, defined by a set of predetermined steps; a graphical display of the exam results; instruction to the student; or a rating of the exam. In a preferred embodiment, the feedback presentation unit is a computer with a processor, display means, and converting means for converting or transforming the signals from the sensors into inputs for the computer. Computer readable code executable by the processor instructs the computer to process the inputs to provide immediate feedback to the student. For example, the code instructs the computer to compare the inputs with a reference exam, which varies with the diseased or normal condition, to derive a rating for the performance. The computer can also include storage means for storing video signals and associated audio signals representing a realistic patient environment and correlated with the reference exam and removable parts used during the exam. The computer readable code controls presentation of the video and audio signals, in addition to processing of the inputs. In alternative embodiments, the feedback presentation unit is a liquid crystal display (LCD) or an analog display.

Also provided by the present invention is a method for training a student to perform an exam performed manually inside a cavity. The method is preferably implemented by a computer and has the following steps: receiving signals from a tactile sensor in a simulator cavity of an anatomical simulator; and providing immediate feedback to the student. Signals are generated in response to a manual contact of the student with an inside surface of the simulator cavity, and the feedback is in part derived from the signals. The feedback also depends on a predetermined exam type, such as a pelvic or rectal exam or surgical procedure, or variations of the exam type. Feedback includes a graphical display, a rating, or instruction to the student. The signals can be compared with a reference exam corresponding to a manually detectable and possibly pathological condition of the cavity to derive the feedback. The signals can also be analyzed to determine whether a set of predetermined steps has been completed by the student, which is indicated to the student in the feedback. Video and audio signals representing a realistic patient environment can be presented to the student.

DETAILED DESCRIPTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

The present invention provides a system and method for teaching students and other health care trainees to perform medical examinations or procedures manually within a body cavity or anatomical space. As used herein, a body cavity refers to any space within a body that is manually accessible from at least one location, but, by virtue of a surrounding tissue, organ, bone, or other anatomical structure, has regions that cannot be viewed without using instruments. A commonality of all such exams or procedures is that they require physicians or practitioners to feel with their hand or hands a surface or object that cannot be seen. While the figures and description below refer mainly to pelvic exams, it is to be understood that all exams and procedures fitting this description are within the scope of the present invention. Furthermore, it will be apparent to one of average skill in the art how to modify the necessary details to apply the invention to any desired exam. Detailed examples of a variety of applicable procedures are given below. While the description below refers primarily to students, it is to be understood that the present invention can be used to train any current or future health care professionals such as medical students, nursing students, residents, or practicing physicians or other professionals. Furthermore, it can also be used by professionals who already know the exam or procedure but want to refresh or test their skills.

Figure 1:
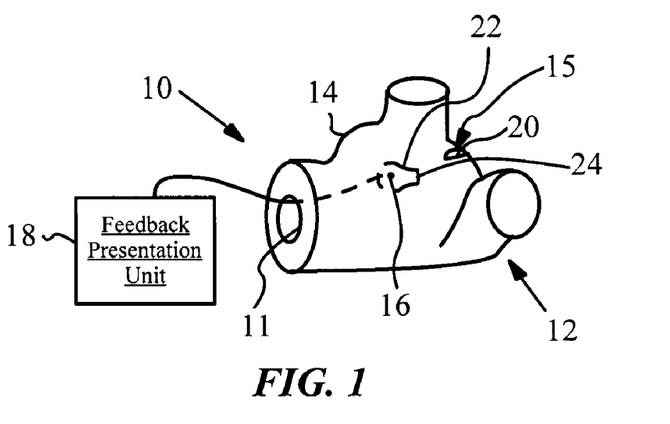
FIG. 1 is a schematic diagram of one embodiment of the training system of the present invention.

A teaching system 10 of the present invention, for training students to perform exams performed manually inside a body cavity, is shown in FIG. 1. The system contains an anatomical simulator 12, in this case made from a manikin 14. Manikin 14 has simulator cavities 11 and 15 and a tactile sensor 16 that is located within manikin 14 so as to generate a signal in response to manual contact with an inside surface of simulator cavity 11 or 15. System 10 also contains a feedback presentation unit 18 in communication with sensor 16. As used herein, the feedback presentation unit provides any type of feedback, including visual, auditory, tactile, olfactory, or any combination of types. Signals generated by sensor 16 are transmitted to feedback presentation unit 18, which generates feedback based in part on the received signals. To perform the exam, the student inserts a hand into opening 20, which gives access to cavity 15, and executes a series of predetermined steps inside cavity 15 and indirectly on organs in cavity 11. Sensor 16 generates a set of signals in response to the performance. Immediate feedback is provided to the student by feedback presentation unit 18.

Figure 2:
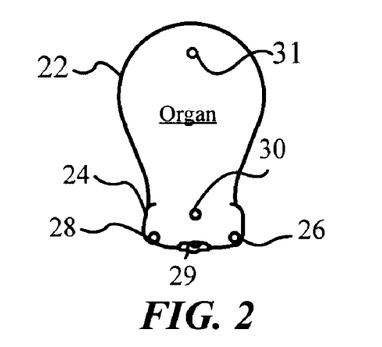
FIG. 2 is a front perspective view of a removable uterus and cervix containing tactile sensors, used in the system of FIG. 1.

Simulator 12 is made from manikin 14 and sensor 16. In one embodiment, system 10 is used for teaching pelvic exams (i.e., complete examinations of the vagina, cervix, uterus, fallopian tubes, and ovaries), and manikin 14 is an anatomical model of the lower half of a human female torso. Other anatomical models are used to teach different exams. Manikin 14 may have removable, interchangeable anatomical parts whose surfaces make up a portion of the inside surface of simulator cavity 11. For example, the manikin may be supplied with a few different interchangeable cervices or uteri, some of which are representative of diseased or abnormal conditions. In general, the interchangeable parts represent the expected human ranges of size, shape, and other qualities of normal and pathological organs. FIG. 2 shows an exemplary removable organ, a uterus 22 with attached cervix 24 for use in simulator 12.

Alternatively, the simulator may be a simple cavity that can conform to many cases. Miniature robots inside the cavity can be used to haptically mimic a variety of scenarios. For example, the same cavity can be used to simulate a pregnant patient or a patient with a cancerous growth in the rectum, vagina, or any intra-abdominal organ, depending upon the response of the robots. The simulator may also be any type of cavity in which manual exams are performed, not necessarily medical exams.

For the present invention, manikin 14 is modified by adding at least one tactile sensor 16. Preferably, the sensor is a force sensing resistor that generates a signal representative of the amount of force applied to the sensor. The sensor is placed within manikin 14 so that the force it detects is related to the force on the inside surface of simulator cavity 11. The sensor can also be a force feedback sensor or miniature robotic equipment that applies a force in response to detecting a force. Sensors are placed in any location on the manikin necessary to gather information indicative of the quality of the exam performance. For example, one indication of a properly performed pelvic exam is palpation of organs at specific locations with a minimum pressure, and sensors are placed at the required locations. In FIG. 2, four discrete sensors 26, 28, 29, and 30 are placed on the organ or anatomical part, one each at the anterior, left and right posteriors, and so of removable cervix 24, and one sensor 31 is placed at the top of uterus 22.

Any variations in the location and type of sensors are within the scope of the present invention. Preferably, the sensors are placed just below the surface of the organs (e.g., cervix 24 and uterus 22 of FIG. 2), so that they are not rubbed off or moved by repeated student contact. Alternatively, they can be secured directly to the surface of the organs. Each interchangeable part can have its own set of attached sensors. Sensors can also be placed on the interior wall of the cavity, or on any location within the cavity. When diseased organs are used, sensors are placed such that detection of the diseased condition requires palpation of the region detected by the sensor. Note that sensors are not necessarily placed on the areas that are palpated. Rather than detecting student hand pressure directly, they can detect a force on an adjacent region caused by palpation. This adjacent region may be a different cavity that is either within or outside the cavity containing the organ or connected to it by an organ accessible to the student.

Tactile sensor technology is developing rapidly, particularly in the field of robotics. It is anticipated that newly developed sensors will expand the capabilities of the present invention. For example, instead of point sensors, a distributed sensor may be used. A distributed sensor can be placed in a sheet around the cervix, for example, and track pressure and location along the sheet. In fact, a particularly advantageous embodiment of the present invention has a distributed tactile sensor placed so that all manual contact (with one or both hands) a student makes with the cavity is detected by the sensor. A much fuller evaluation of the student's performance can be made with such a sensor.

The optimal number, location, and type of sensors vary with the pathological or normal condition represented by the cavity or organs and with the desired fidelity. For example, detection of an abnormal condition in one region of the cavity may require palpation of a second region that is not palpated under normal conditions. The second region contains a sensor only when the exam tests detection of abnormal conditions. A high fidelity exam in general contains more sensors to generate a more accurate representation of the exam being performed. A low fidelity exam contains fewer sensors and therefore generates a more limited reproduction of the exam. The number, type, and location of the sensor or sensors in general affect other parts of the system, such as the feedback presentation unit.

Figure 3:
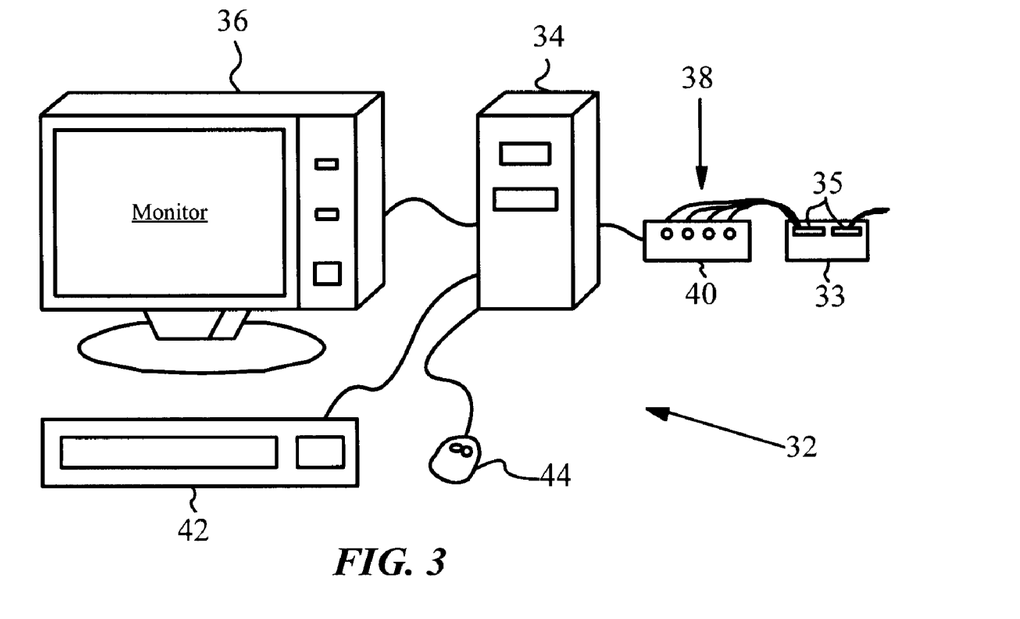
FIG. 3 is a schematic diagram of a preferred embodiment of the feedback presentation unit of the present invention, a computer system.

FIG. 3 shows a currently preferred embodiment of feedback presentation unit 18, a computer system 32 containing a computer 34; input and output devices such as a display means or monitor 36, keyboard 42, or mouse 44; and an interface 38 for interfacing sensor 16 with computer 34. Computer 34 contains standard elements such as a processor, data bus, various memories, and data storage devices. Interface 38 contains lines and converting means for converting the set of signals from sensor 16 into inputs for computer 34. For some sensors, analog voltage signals from the sensor must be converted into digital inputs to the computer using standard hardware and methods known in the art. For example, sensor 16 is connected to quad op-amplifiers 35 on a bread board 33 by twisted wire. Bread board 33 is also connected to an in-and-out connector block 40, which is connected through a serial port of computer 34 to a data acquisition card (not shown) within computer 34. While FIG. 3 illustrates a typical computer system, other embodiments are possible. For example, interface 38 may instead by implemented with wireless devices. Alternatively, the entire computer system and sensor are contained within a single small unit within simulator 12, and the feedback, e.g., auditory feedback, is provided directly from the small unit.

The objective of the feedback provided by the feedback presentation unit is to train the student to recognize characteristics of the internal surface of the cavity by touch alone. Viewing real-time feedback and receiving instructor guidance based on that feedback together allow the student to determine what he or she should be feeling, and then internalize that knowledge. Accordingly, the feedback presentation unit provides any type of feedback, including positive, negative, or summative, that attains the above objective. Feedback can be provided in visual, auditory, tactile, or olfactory format, or any combination of these. In the embodiment of FIG. 3, computer readable code stored within memory and executed by the computer's processor instructs the computer to process the inputs originating from the sensor or sensors to create feedback for the student and instructor. In general, the type of feedback and manner in which it is conveyed to the student are tailored to the educational objectives, type of exam, and ability and experience level of the student, among other factors. Preferably, a single system contains a number of possible variations of the feedback, selectable by the student or instructor. Upon reading this description, one of average skill in the art will be able to write appropriate computer readable code to implement the various embodiments of the present invention.

Figure 4:
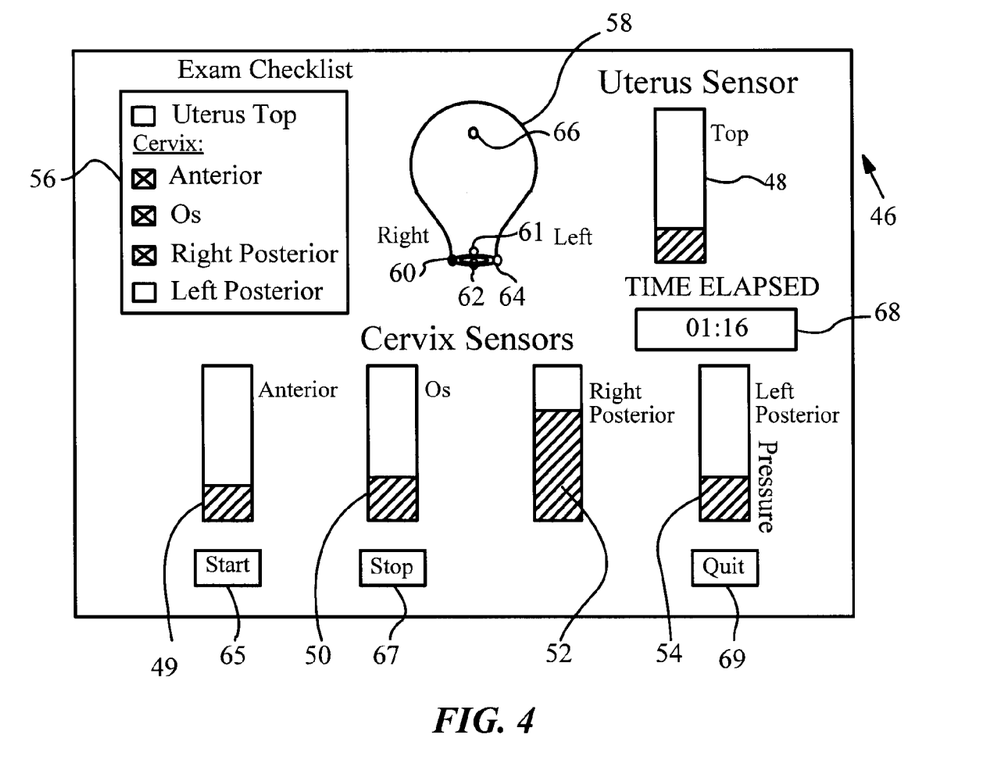
FIG. 4 is a monitor display showing one embodiment of graphical feedback.

One embodiment of the feedback is a real-time graphical display of the sensor inputs. FIG. 4 shows a monitor display of graphical feedback 46 that provides instantaneous pressure readings from the sensors. Feedback 46 is purely illustrative of one type of feedback, and in no way limits the scope of the present invention. In the exam that produces the display of FIG. 4, the student must palpate five specific regions with a minimum pressure. The five regions include the anterior and left and right posterior surfaces of the cervix, the cervical so (center), and the top (anterior-superior surface) of the uterus. The display of FIG. 4 contains bars 48, 49, 50, 52, and 54, one for each palpation region, an exam checklist 56, and an illustration 58 with indicators 60, 61, 62, 64, and 66. Illustration 58 represents uterus 22 and cervix 24 of FIG. 2, with associated sensors. Graphical feedback 46 also includes an elapsed time 68, and "Start," "Stop," and "Quit" buttons 65, 67, and 69 that can be clicked with a mouse pointer or other input device. As pressure is applied to each of the sensors by the student, the appropriate bar is filled in, with the filled volume proportional to the applied pressure. The scale of bars 48, 49, 50, 52, and 54 is set either in the computer readable code or via user input. When the student palpates the right posterior cervix with a minimum required pressure, bar 52 fills and indicator 60 turns on. In checklist 56, the box beside cervix "right posterior" is checked. When the student releases pressure, bar 52 is less filled, and indicator 60 is deactivated. However, the box beside "right posterior" remains checked to indicate exam progress. Illustration 58 is highly schematic in FIG. 4, but it may be replaced by a detailed illustration of the patient's interior landscape and location of the student's hand. Elapsed time 68 stops either when the student palpates all of the required areas, or when the user clicks "Stop" button 67. Similarly, the student begins the exam by clicking "Start"button 65.

Within the computer readable code, the instructor sets the minimum required pressure and a range of prescribed pressures. Alternatively, when the code is first executed, the computer requests pressure information from the instructor. Appropriate pressures vary with the patient's clinical condition, student's hand size or expertise, and other variables. Many other relevant graphical displays can be imagined, depending on the type and distribution of sensors, exam type, student experience, and other factors. For example, the graphical display can include a map corresponding to the pattern of pressure applied. The graphical display can be implemented using standard techniques, programming languages, and commercial software development tools, as apparent to one of average skill in the art.

System 10, incorporating the graphical display embodiment of FIG. 4, is designed for use by a student and instructor together. Standard operation proceeds as follows. First, the instructor performs the exam while the student watches graphical display 46 and notices the appropriate palpation pressure and duration and exam timing. Next, the student performs the exam while the instructor watches graphical display 46 and gives feedback to the student. The student integrates tactile information with instructor feedback to gain a better understanding of proper exam technique.

In an alternative embodiment of the computer readable code, the computer memory contains a stored reference exam. The reference exam consists of pressure versus time data for each sensor, and may be obtained from an average of exams performed by a professor, clinician, or other expert. For a distributed sensor, the stored exam also contains location data. There may be multiple stored reference exams, each associated with a diseased condition of a removable part of the simulator or other condition. During the exam performance, inputs are stored as pressure versus time data for each sensor. The student data is compared with the stored reference exam to derive a rating for the exam or to give instruction during the exam. The rating can be based on coverage, pressure levels, duration of pressure at a given location, overall exam time, or any other suitable measure.

Figure 5:
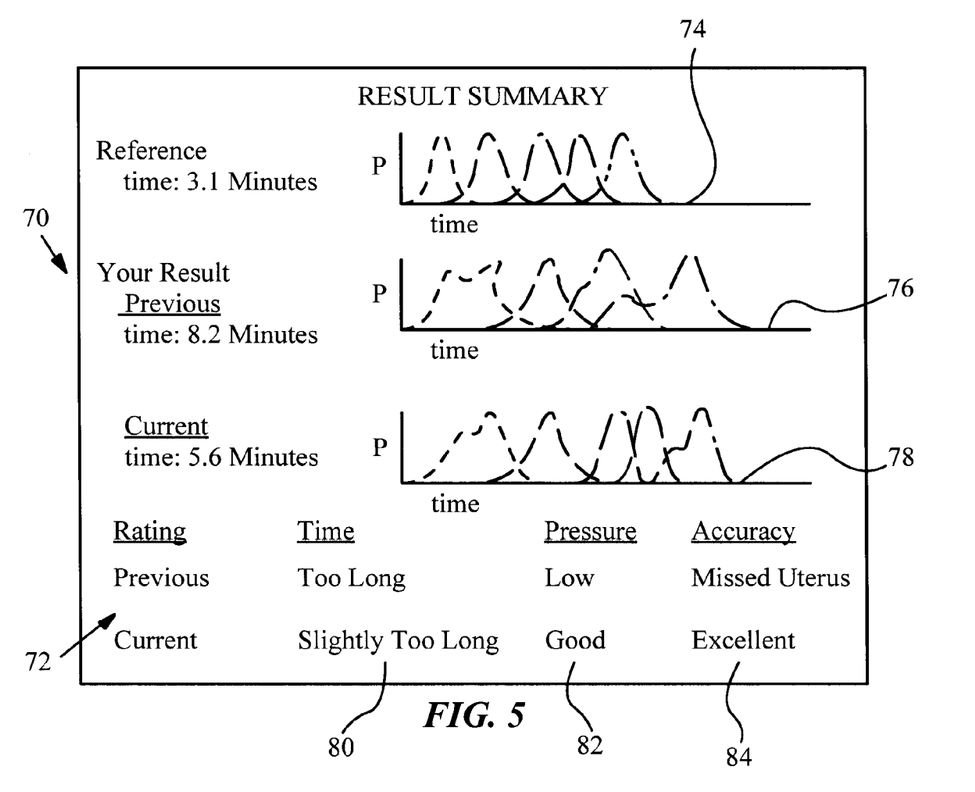
FIG. 5 is a monitor display showing an alternative embodiment of graphical feedback.

FIG. 5 shows a monitor display 70 of possible performance ratings. Display 70 is purely illustrative of a ratings display, and in no way limits the scope of the present invention. Monitor display 70 appears after the student completes an exam performance. The reference exam is displayed in a reference exam graph 74, which displays pressure versus time for each of the four sensors. Of course, reference exam graph 74 depends on the number and type of sensors used. Also displayed are previous performance graph 76 and current performance graph 78. Previous results for the same student may be stored in a data storage device and displayed to demonstrate the student's progress. Also displayed are qualitative ratings 72 for the performance: a time rating 80, a pressure rating 82, and an accuracy rating 84. Any suitable ratings system may be developed for the present invention, including quantitative ratings systems.

In a further alternative embodiment, the feedback is instruction, preferably audio instruction, provided to the student during the performance. For example, if the computer input indicates that the pressure is below the reference exam pressure at a given location, but above the background pressure, the computer readable code directs play of an audio file that says "press a little harder." This embodiment can be used by a student alone or with a student partner; an instructor is not required.

Figure 6:
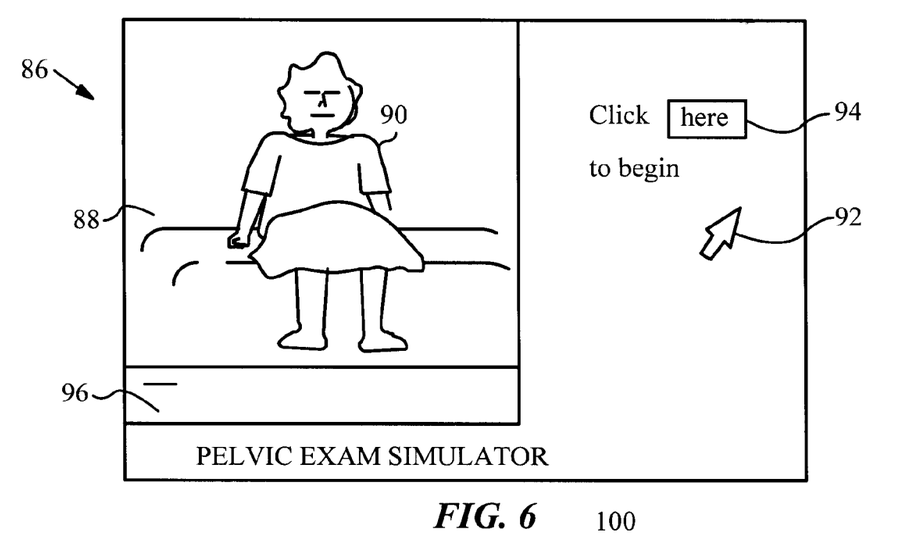
FIG. 6 is a monitor display showing video signals.

The computer system can also contain storage means for storing video signals and associated audio signals representing a realistic patient environment. Preferably, the audio and video signals are located in files stored in the memory or storage device of the computer. The computer readable code controls presentation of the files to the student. FIG. 6 shows a monitor display 86 containing a video signal 88. Display 86 is purely illustrative of video displays and does not limit the scope of the present invention. Video signal 88 is of a patient 90 on whom the student will perform a pelvic exam. Patient 90 in video signal 88 can be in any suitable environment in which the exam is performed, such as an emergency room, examination room, delivery suite, or other clinical setting, and can be a new healthy or diseased patient or a follow-up patient. Based on the patient's requests and other information conveyed in video signal 88 and associated audio signals, the student determines the appropriate exam to perform. To begin playing the video signal, the student uses mouse 44 to direct cursor arrow 92 to button 94 and clicks the mouse button. In box 96, the student can type a message to patient 90 in response to audio signals associated with video signal 88. The reference exam used to rate the student's performance is correlated with video signal 88. The exam rating may include an evaluation of the student's input in box 96. For example, the student must properly introduce him- or herself to the patient before beginning the exam.

Preferably, the computer system maintains a database of exams and cases that can be regularly updated by a user. For example, a senior resident performs a patient exam and records a video of the patient and procedure. She then devises a reference exam case containing the procedure she performed, her diagnosis, and a recommended treatment. The case along with the associated video is incorporated into the database and used to train a junior resident. The junior resident views the video and performs an exam on the simulator to determine whether he arrives at the same diagnosis and treatment recommendation as the senior resident.

In addition to providing feedback to the student and instructor during performance of the exam, the computer can also store student performance data and ratings. Later, the instructor can examine the data of students that did not perform adequately to determine which part of the exam or technique the student is having difficulty learning. The instructor can then tailor instruction to address the student's deficiencies. Students may also assess their own performance and practice on certain areas before seeking the advice of an instructor.

Figure 7:
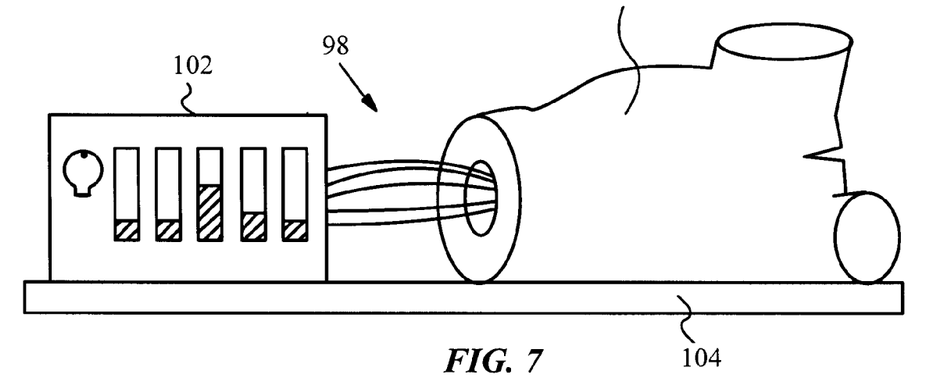
FIG. 7 is a schematic view of a portable embodiment of the invention.

The present invention may be made portable and inexpensive through the use of alternative feedback presentation units. FIG. 7 shows a portable training system 98 in which a simulator 100 containing sensors is connected with a display screen 102. Both are mounted on support 104. Presentation unit 102 is simple and lightweight and provides a graphical display of the pressures exerted by a student. Presentation unit 102 contains simplified processing means specifically for processing inputs from the sensors.

Figure 8:
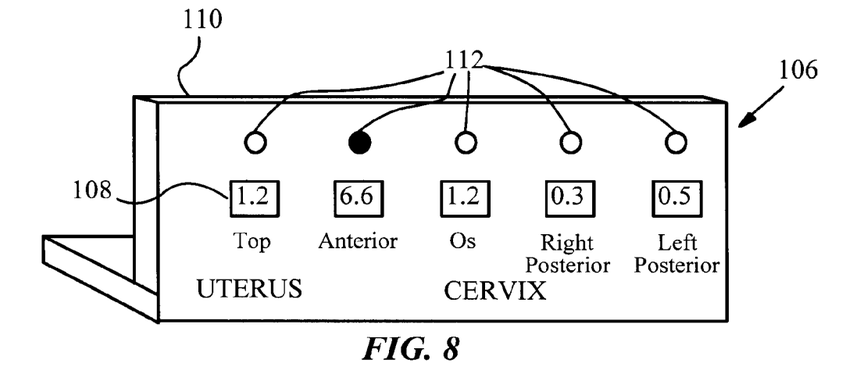
FIG. 8 is a front perspective view of an LCD feedback presentation unit.

An additional alternative feedback presentation unit, an LCD (liquid crystal display) display unit 106, is shown in FIG. 8. Inputs to the unit are displayed as digital pressure readings 108. Also contained on a base 110 are light sources 112 that generate light when the pressure exceeds a minimum. It is well known in the art how to translate voltage signals into accurate LCD displays.

The system of the present invention can be adapted for use in training facilities without access to computers or even basic electronics, for example, in developing nations. Rather than electronic sensors that produce voltage signals, the sensors may be fluid-filled sacs placed at desired locations on the manikin. In this case, the feedback presentation unit is a set of manometers, interfaced to the sensors by plastic tubing. Because of the low pressures required, water manometers made from thin glass tubing would be suitable.

Figure 9A:
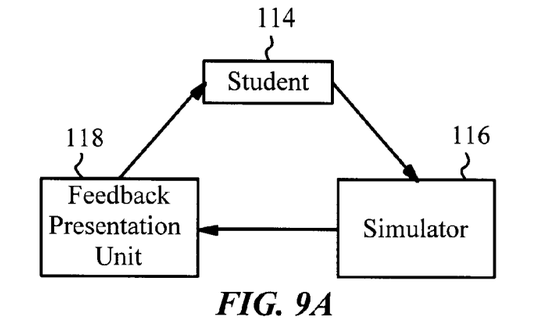
FIGS. 9A–9D are block diagrams of alternative interactions among the student, simulator, and feedback presentation unit.
Figure 9B:
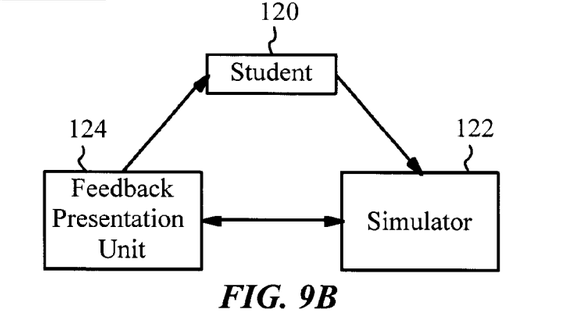
Figure 9C:
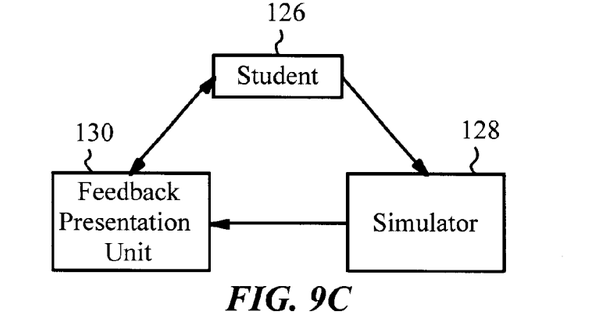
Figure 9D:
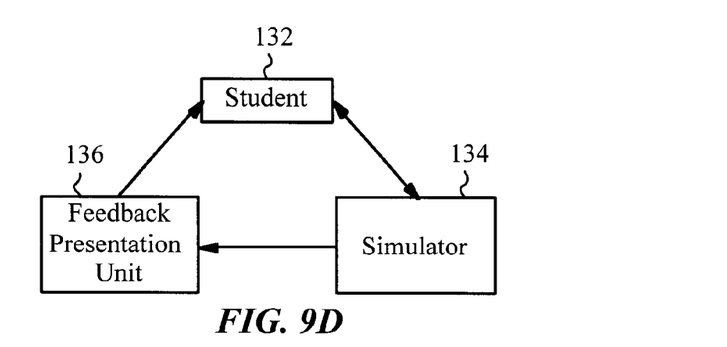

A general embodiment of the training system described above is depicted schematically in FIG. 9A. A student 114 contacts a simulator 116, and the sensor within the simulator transfers information to a feedback presentation unit 118. Feedback presentation unit 118 provides feedback to student 114, causing student 114 to modify the contact with simulator 116. FIG. 9B depicts an alternative embodiment. Again, a student 120 contacts a simulator 122 containing a sensor that generates a signal. The signal is transferred to a feedback presentation unit 124. In addition, feedback presentation unit 124 includes a controller for adjusting the behavior or structure of simulator 122, according to either a preset program or in a response to contact supplied by student 120. The student perceives this change and adjusts the contact accordingly. A third embodiment is shown schematically in FIG. 9C. The initial three interactions among a student 126, a simulator 128, and a feedback presentation unit 130 still exist. Now, student 126 must also interact directly with feedback presentation unit 130, either by answering questions posed or by describing information gathered through contact with simulator 128. For example, a diseased patient may require further medical treatment. Based on the exam results, the student inputs treatment recommendation into the computer. Student inputs can be through any input device, such as a keyboard, mouse, joystick, pen, microphone and speech-recognition element, or some combination of these devices. Finally, FIG. 9D illustrates a fourth embodiment, the so-called virtual reality embodiment, which still contains the original three interactions among a student 132, a simulator 134, and a feedback presentation unit 136. In this embodiment, simulator 134 is not an anatomical manikin, but a robot or virtual reality (VR) glove that responds to the student's hand movements by applying a force to the student's hand. For example, the student watches an image of a patient that is correlated with the movement of the VR glove. Only the portion of the student's hand remaining outside the patient body is visible. As the student performs the exam, the glove provides tactile feedback corresponding to the inner surface of the body cavity, simulating the feeling a student would have performing the exam on a live patient. The moving glove is in some ways more representative of a live patient than is a manikin. Combinations of the above four embodiments will be obvious to one skilled in the art upon reading this description, and are therefore within the scope of the present invention.

The present invention may be used to train students to perform any type of exam or procedure performed manually within a body cavity. For example, rectal exams are similar to pelvic exams in that they are performed manually within a body cavity and rely on the practitioner's ability to feel and recognize particular surfaces without being able to see them. The teaching system of the present invention provides for a variety of rectal exams on simulated normal patients and a variety of exams on simulated patients with pathological conditions. For example, students are trained to perform prostate exams on normal and pathological patients and rectal exams for locating cancerous anal lesions in different locations.

Figure 10:
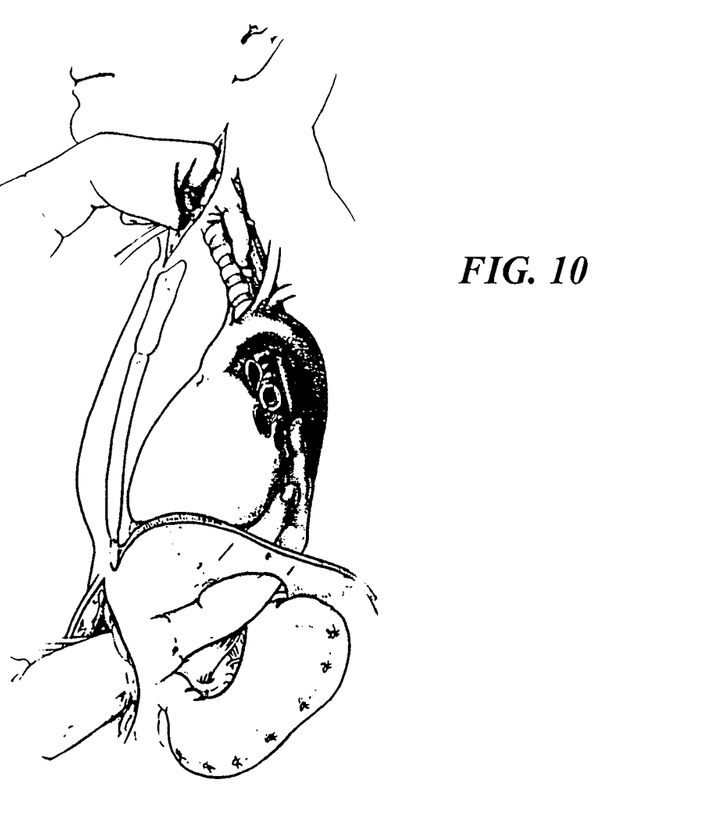
FIG. 10 illustrates a transhiatal esophagectomy.
Figure 11:
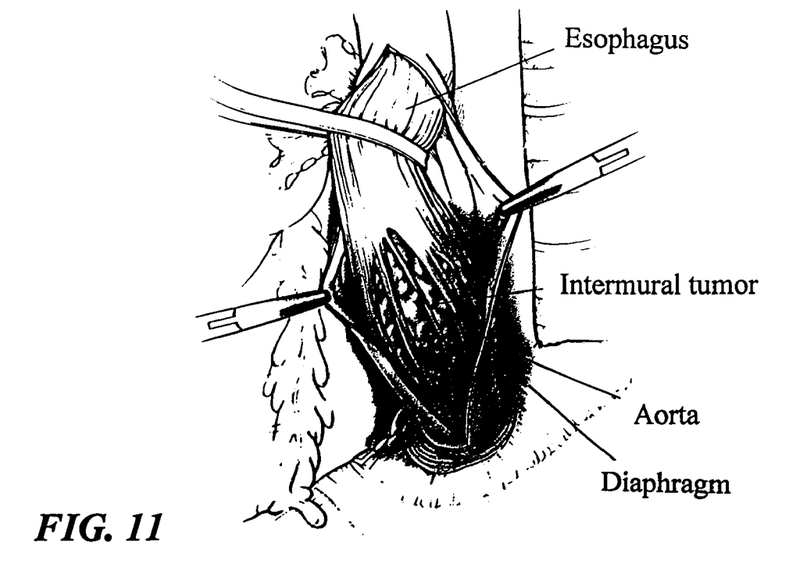
FIG. 11 illustrates dissection of an intramural esophageal tumor.
Figure 12:
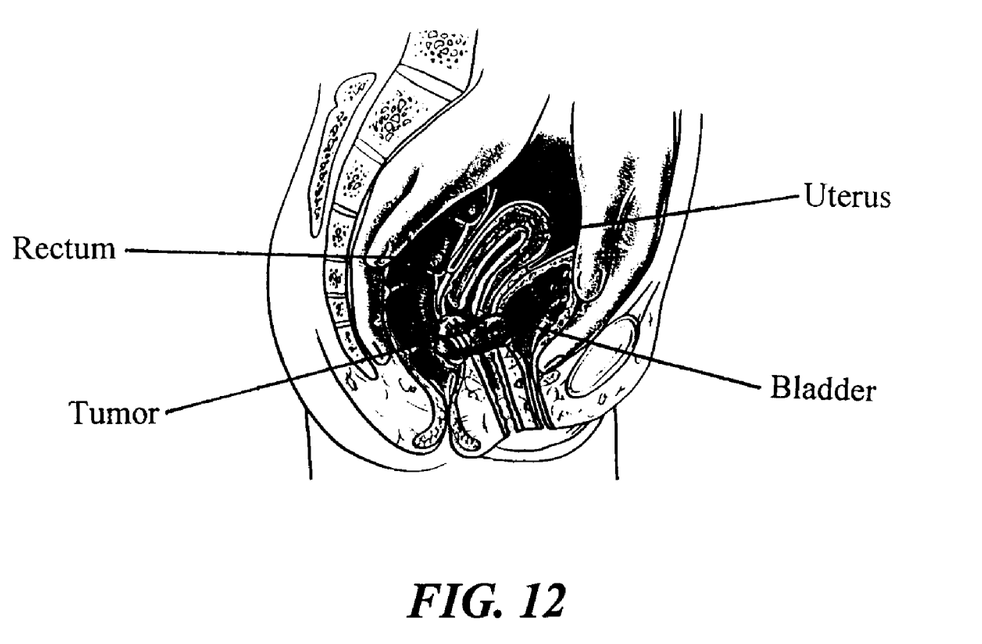
FIG. 12 illustrates a pelvic extenteration.

Many surgical procedures have a component that must be performed manually inside an anatomical space or body cavity, and any such procedure can be taught using the present invention. For example, abdominal surgery often requires intraoperative assessment of internal abdominal organs, in which the surgeon feels with his or her hands particular areas that are not visible, such as behind the liver. The liver is positioned directly against the diaphragm, covered by the ribs, and surrounded by a network of blood vessels. Removing the liver to see behind it is obviously unfeasible. By hand, the surgeon can feel tumors or adhesions, undesired contact between the liver and diaphragm resulting from liver inflammation, that are otherwise not visible. Similarly, surgical procedures for colon cancer require manual inspection of all palpable organs such as the liver and spleen. Prostatectomies (prostate removal), which entail manual removal of the prostate, are notoriously difficult to teach. The procedure cannot be seen by the student, and only a few fingers can be inserted, preventing the student from seeing or feeling the performance of the instructor. Dissections around the trachea and esophagus require the surgeon to insert his or her fingers around the trachea and esophagus to obtain information about the hidden region. FIG. 10 illustrates one of the maneuvers performed during a transhiatal esophagectomy, in which a portion of the esophagus is dissected bimanually. As shown in the figure, the surgeon inserts one hand through the hiatus of the diaphragm and the other through a cervical incision in the neck, taking extreme care to prevent tearing of the membranous portion of the trachea. The bimanual dissection continues until the fingers of the two hands meet. FIG. 11 illustrates a procedure for removing an intramural esophageal tumor. In many cases, the tumor is separated from the surrounding tissue and removed by hand, requiring careful attention of the surgeon not to injure the mucosa. FIG. 12 illustrates a pelvic extenteration, a treatment for various gynecologic cancers performed bimanually. All of these surgical procedures (or parts of the procedures) are done by hand and require the student to learn the anatomy by feel. They are therefore particularly good candidates for applications of the present invention.

It will be clear to one skilled in the art that the above embodiments may be altered in many ways without departing from the scope of the invention. For example, the feedback presentation unit may have different modules for interacting with students of different levels. The emergency situation simulated in the video signal may be enhanced by a process in which the computer telephones the student at an unexpected time. In response to the telephone call, the student must perform an exam, evaluate the patient, and make further recommendations. Accordingly, the scope of the invention should be determined by the following claims and their legal equivalents.

What is claimed is:

1. A system for training a student to perform a medical exam using at least one hand of said student for direct human contact with a body cavity, said system comprising:
    a) an anatomical simulator having a simulated body cavity with an inside surface wherein said at least part of said inside surface is not visible to said student;
    b) a sensor in said anatomical simulator for generating signals in response to a manual contact of said at least one hand of said student with said inside surface of said simulator simulated body cavity, wherein said contact represents said medical exam; and
    c) a feedback presentation unit in communication with said signal from said sensor for providing feedback to said student so as to train said student to performed said medical exam.

2. The training system of claim 1 wherein said sensor is a force sensing resistor and said signals represent a force on said inside surface.

3. The training system of claim 1 wherein said anatomical simulator and said feedback presentation unit are adjustable to provide feedback for one of a plurality of different medical exams.

4. The training system of claim 1 wherein said medical exam is a pelvic exam and said anatomical simulator comprises the lower torso of a human female.

5. The training system of claim 1 wherein said medical exam is a rectal exam and said anatomical simulator comprises the lower torso of a human.

6. The training system of claim 1 wherein said medical exam comprises a surgical procedure.

7. The training system of claim 6 wherein said surgical procedure is selected from the group consisting of abdominal, pelvic, and thoracic surgery.

8. The training system of claim 7 wherein said surgical procedure is selected from the group consisting of prostatectomy, pelvic extenteration, and transhiatal esophagectomy.

9. The training system of claim 1 wherein said anatomical simulator comprises a plurality of removable anatomical parts having surfaces, and wherein said inside surface of said simulated cavity comprises said surfaces of said removable anatomical parts.

10. The training system of claim 9 wherein at least one of said plurality of removable anatomical parts represents a diseased condition, and said medical exam is correlated with said diseased condition.

11. The training system of claim 1 wherein said medical exam comprises a set of predetermined steps and said feedback comprises an indication of completion of said set of predetermined steps of said medical exam.

12. The training system of claim 1 wherein said feedback presentation unit comprises:
    a) a computer having a processor, a display means, and a memory; and
    b) converting means for converting said signals to inputs for said computer;
wherein said memory stores computer readable code executable by said processor to process said inputs to provide said feedback.

13. The training system of claim 12 wherein said feedback comprises a graphical display on said display means.

14. The training system of claim 12 wherein said feedback comprises a rating for said medical exam, and wherein said computer readable code instructs said computer to compare said inputs with a reference medical exam to derive said rating.

15. The training system of claim 12 wherein said feedback comprises instruction to said student and said computer readable code instructs said computer to compare said inputs with a reference medical exam during said medical exam to determine said instruction.

16. The training system of claim 12, wherein said computer further comprises storage means for storing video signals and associated audio signals representing a realistic patient environment, and said computer readable code controls presentation of said video signals and said associated audio signals.

17. The training system of claim 1 wherein said feedback presentation unit comprises a liquid crystal display.

18. The training system of claim 1 wherein said feedback presentation unit is an analog display unit.

19. A method for training a student to perform a medical exam using at least one hand of said student for direct human contact with a body cavity, said method comprising:
   a) receiving signals from a sensor in a simulated body cavity of an anatomical simulator wherein said simulated body cavity has an inside surface and at least part of said inside surface is not visible to said student, wherein said signals are generated in response to a manual contact of said of at least one hand of said student with said simulated simulated cavity; and
   b) providing feedback to said student, wherein said feedback is in part derived from said signals so as train said student to perform said medical exam.

20. The method of claim 19 wherein said feedback depends in part on a predetermined medical exam type.

21. The method of claim 19 wherein said medical exam is selected from the group consisting of a pelvic exam, a rectal exam, and a surgical procedure.

22. The method of claim 19 further comprising comparing said signals with a reference medical exam to derive said feedback.

23. The method of claim 22 wherein said reference medical exam corresponds to a manually detectable condition in said simulated body cavity.

24. The method of claim 23 wherein said reference medical exam corresponds to a pathological condition of an said simulator body cavity.

25. The method of claim 19 further comprising analyzing said signals to determine whether a set of predetermined steps has been completed by said student, wherein said feedback comprises an indication of completion of said set of predetermined steps of said medical exam.

26. The method of claim 19 wherein the method is implemented in a computer.

27. The method of claim 26 wherein said computer comprises a display means and said feedback comprises a graphical display on said display means.

28. The method of claim 19 wherein providing said feedback comprises providing a rating for said medical exam.

29. The method of claim 19 further comprising providing instruction to said student.

30. The method of claim 29 wherein said instruction is determined in part from said received signals.

31. The method of claim 19 further comprising presenting video signals and audio signals to said student, wherein said video signals and said audio signals represent a realistic patient environment.

* * * * *